UNITED STATES PATENT OFFICE.

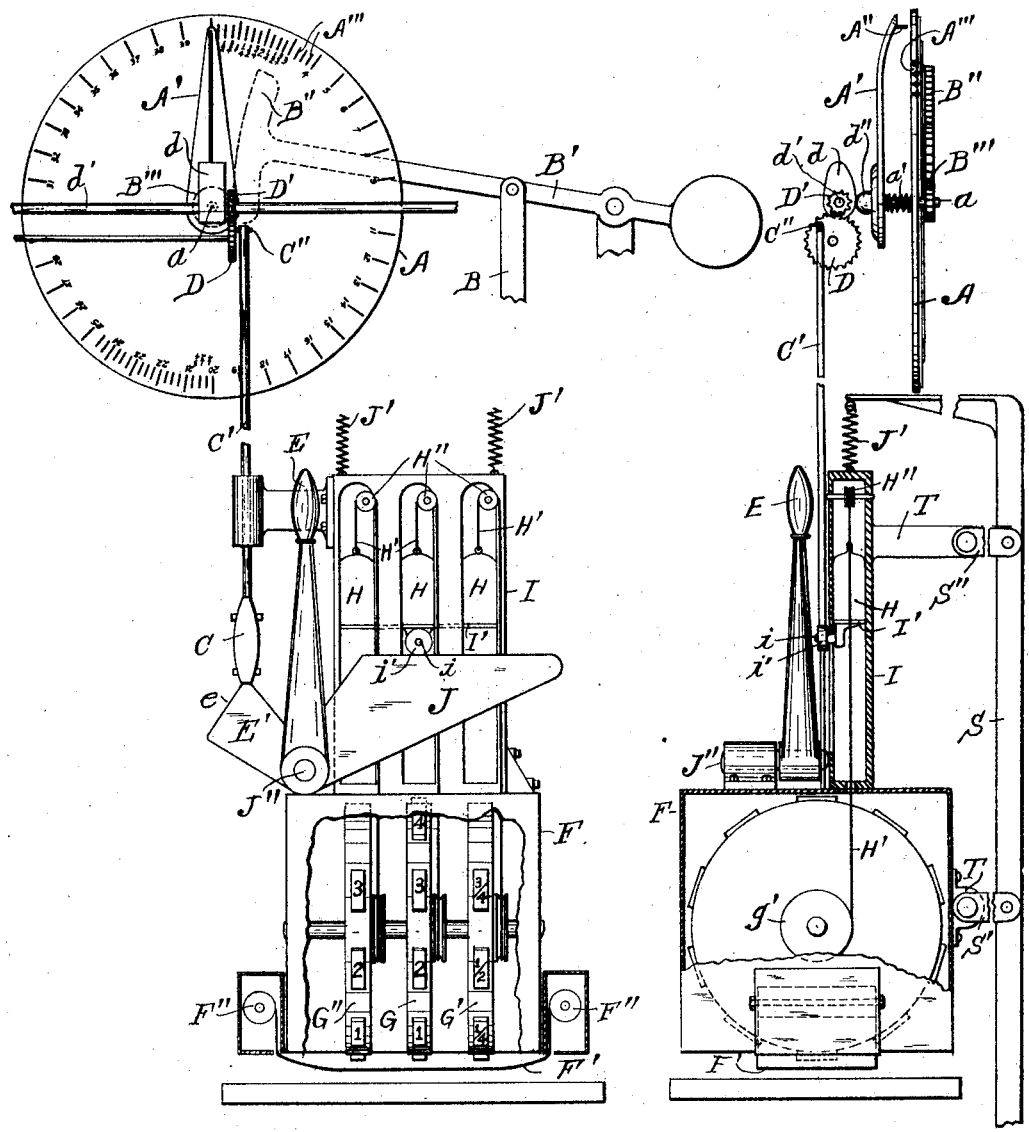

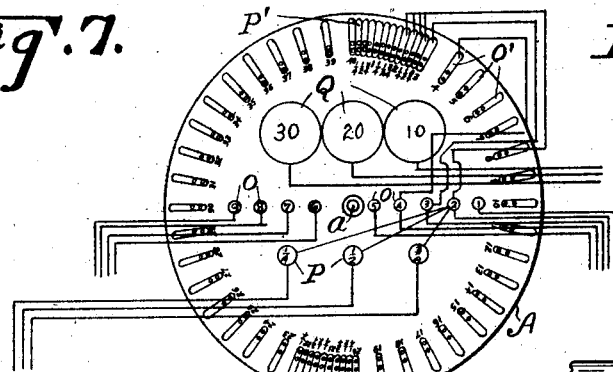
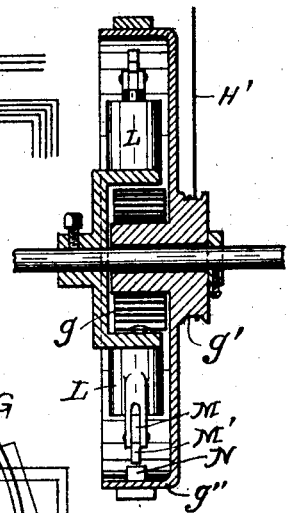
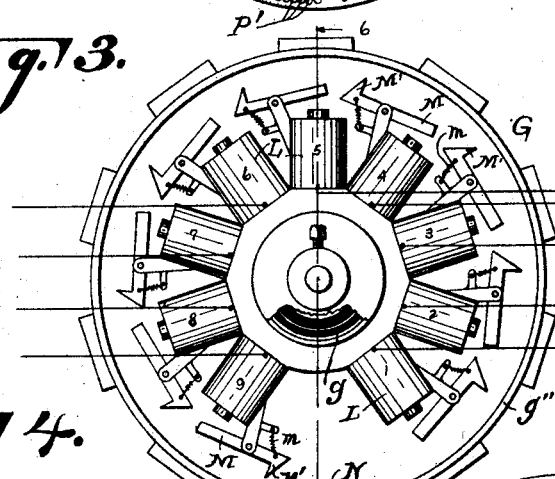
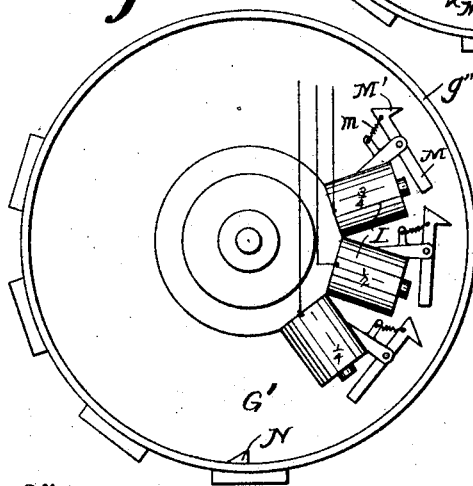
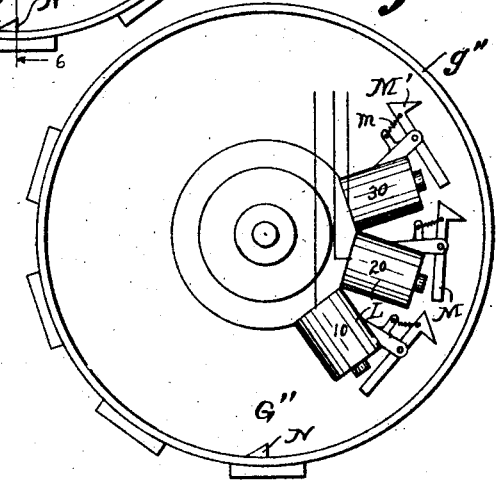

ROY E. TOUCHETT, OF FOND DU LAC, WISCONSIN.

LEATHER-MARKING APPARATUS.

1,350,346.  Specification of Letters Patent.  Patented Aug. 24, 1920.

Application filed October 3, 1918. Serial No. 256,721.

*To all whom it may concern:*

Be it known that I, ROY E. TOUCHETT, a citizen of the United States, residing at Fond du Lac, county of Fond du Lac, and State of Wisconsin, have invented new and useful Improvements in Leather-Marking Apparatus, of which the following is a specification.

My invention relates to improvements in leather marking apparatus, to be used in marking hides or strips of leather to indicate the dimensions thereof.

The object of my invention is to provide suitable apparatus which may be operatively connected with a leather measuring machine in such a manner that motion will be transmitted from the measuring wheels or rollers to an indicator or indicator pointer to swing the latter over the face of a dial, and correctly indicate the dimension ascertained by means of the measuring machine, the pointer being then closed to close an electrical circuit, and cause a corresponding adjustment of a set of type carrying wheels in such positions that the appropriate types may be depressed into contact with the leather, or with the recording strip, by means of a manually operable lever.

More specifically, it is the object of my invention to mount a set of type carrying wheels within a suitable cage normally held by a spring, or springs, in a raised position above a suitable bed plate, the lower end of the cage being open and spanned by an inking ribbon disposed underneath the wheels in the path of the operating types. The entire cage may be depressed by an operating lever which, during its initial movement, allows circuits to be connected up through electro-magnetic devices adapted to control the rotation of the wheels, the lever simultaneously releasing a set of wheel operating weights, whereby the wheels may be actuated to the limit of movement permitted by the electro-magnetic mechanism. In this manner, a single manually controlled lever is adapted to utilize the indicator pointer, (previously adjusted by the measuring machine), to close an electric circuit, release the wheel operating weights, and subsequently depress the wheels into printing position.

In the drawings:—

Figure 1 is a general view of my improved apparatus, with the casing of the cage partially broken away, and with the front wall of the weight inclosing housing removed.

Fig. 2 is a view of the same, taken at right angles to Fig. 1, with the cage wall and weight housing shown partially in vertical section.

Fig. 3 is a detail view of the unit wheel with its associated magnets.

Fig. 4 is a detail view of the fraction wheel.

Fig. 5 is a detail view of the tens wheel.

Fig. 6 is a sectional view, drawn on line 6—6 of Fig. 3.

Fig. 7 is a rear face view of the dial showing the electrical connections.

Like parts are identified by the same reference characters throughout the several views.

A is a dial, having its face subdivided by a series of contact points and index marks into sections and intermediate fractional sections, each section representing a unit of measurement, which, for the purpose of this description, may be assumed to be one square foot. The fractional units may, for the purpose of this description, be assumed to represent one-quarter, one-half, and three-quarters of a square foot respectively. For convenience of illustration only a few of the index marks or contacts will be indicated on the dial, and these will be shown on a larger scale, proportionate to the diameter of the dial, than will be the case in actual practice, it being understood that any desired number of these contact points may be employed by merely increasing the size of the dial, and multiplying the contacts and their connections.

A pointer A', mounted to rotate with the dial supporting arbor a, is adapted to slide upon said arbor, and is normally supported in spaced relation to the dial by a spring a' coiled about said arbor. The pointer A' is provided with a contact finger A'', adapted to enter sockets A''' in the face of the dial, the base of each socket being provided with an electrode or contact terminal, as hereinafter described. The sockets in the face of the dial are disposed in such close proximity, and the contour of the intervening walls is such that when the pointer is pushed inwardly toward the dial against the recoil of the spring a', the contact finger A'' will enter one or another of the sockets, according to the position of the pointer, there being no intervening ledge of sufficient breadth to serve as a stop for the movement of the contact finger.

Motion is transmitted, to swing the pointer to a dimension indicating position, from a link B connected with the leather measuring machine. This shaft transmits motion to the pointer through the counterweighted lever B', gear segment B'' and pinion B''', the latter being mounted on the arbor $a$. When the pointer has been thus adjusted to an indicating position, its contact finger A'' may be driven into the opposing terminal socket in the dial by a suitable weight C, operating through the hanger rod C', crank pin C'', gear wheels D and D', and cam $d$, the latter being fast upon the shaft $d'$, on which the gear wheel D' is mounted. When the gear wheel D' is thus rotated by a depression of the weight C, cam $d$ pushes against a knob $d''$ connected with the pointer at the axis about which the pointer swings, and in which knob the arbor $a$ is socketed. The cam therefore pushes the pointer inwardly toward the dial until the contact finger A'' is entered in the registering socket. The pointer will thereupon remain in position until the weight C is again raised, whereupon the cam $d$ will be retracted, and the pointer will be pushed outwardly by the spring $a'$.

Leather measuring machines are in common use, and it is not deemed necessary to illustrate such machine, their structure and mode of operation being well known in this art.

The weight C is released for a downward movement by means of a manually operable lever E, this lever having a cam shaped arm E', adapted, when the lever is in normal upright position, to support weight C in the raised position in which it is illustrated in Fig. 1. When the lever is swung forwardly, (toward the right in Fig. 1), the inclined surface $e$ of the cam shaped lever arm E' allows the weight to slide downwardly along this surface, the movement of the weight being thus controlled and made gradual so that it will not jerk upon the crank pin C'', and develop uncontrolled momentum in the gear wheels.

*The type wheels and the means for controlling and operating them.*

A series of type wheels are mounted within a suitable cage or casing F. The units type wheel G contains type numerals 1 to 9 inclusive, in addition to a zero type. The fraction wheel G' also contains a zero type, and fraction printing types one-quarter, one-half, and three-quarters respectively. The tens wheel G'' also contains a zero type and any desired number of additional number types in serial order, as on the units wheel. Coiled springs $g$ are adapted to normally hold all of the wheels, with the zero types at the bottom in printing position above an ink ribbon F', which spans the open lower end of the casing, and is wound upon rollers F'', whereby when the type wheels are depressed to force the ink ribbon into contact with the surface to be printed upon, a printing operation will be effected in a well known manner.

The type wheels are actuated from normal position by means of weights H, each connected with one of the wheels by a cord H' which passes over a pulley H'' mounted in the weight housing I, the cord then passing downwardly through the weight housing, and being wound upon a pulley $g$ rigidly connected with the associated type wheel. The housing I is mounted directly upon and secured to the casing F which incloses the type wheels, suitable apertures being provided, whereby the cords H' may pass downwardly to the respective pulleys or drums $g$.

The weights are normally supported within the weight housing I by a bar I', having at the center thereof an outwardly projecting pin $i$ which carries a roller $i'$ exterior to the housing, and which normally rests upon a cam arm J, connected with the operating lever E, whereby when the operating lever E is in raised position the weights will be supported in a raised position, and will be inoperative to actuate the type wheels. But when the cam arm J is depressed the weights will be released, and will travel downwardly within the housing. The arrangement is such that if the weight moves downwardly to the limit of its positive stroke, the type wheel or number wheel with which it is associated will be turned one complete revolution, and will therefore present the zero type in printing position. This will occur whenever the lever is depressed to the limit of its swinging movement, unless the type wheels are arrested in their rotative movement by the electro-magnetic mechanism now to be described; and therefore unless the rotation of the type wheel is electro-magnetically arrested, a downward movement of the wheel carrying cage will invariably result in printing zero marks upon the leather, or any other record receiving strip disposed upon the bed plate J.

The cage F and housing I are resiliently supported by springs J', whereas the fulcrum shaft J'' of the lever E is relatively fixed. Therefore, when the lever is swung, as above described, to move cam arm J downwardly, said arm J will eventually bear upon the top of the cage F, and depress the latter, thus carrying the type wheels downwardly and forcing the types into contact with the ink ribbon, and pressing the latter against the record receiving material.

The rotative movement of the type wheels is controlled by a set of relatively stationary electro-magnets L concentrically mounted about the hub of each wheel. Each magnet is provided with an armature M provided with a hook M', normally retracted from the rim g' of the type wheel by a spring m. But when the magnet L is energized the associated armature M will be swung to bring the hook M' into close proximity with the rim of the wheel. Thereupon it will be in position to engage a stop catch N mounted on the inner face of said rim, thereby arresting the movement of the wheel.

When the pointer finger A'' is driven into a socket, as above explained, a circuit will be closed through the appropriate magnet, or magnets, in order to arrest the motion of one or more of the wheels in position, with type numerals on the wheels adjusted for printing the dimensions indicated by the pointer on the dial. If the dimension is merely a fractional dimension, only one magnet will be energized, (i. e., one of the magnets on the fraction wheel G'). But if a whole number dimension is indicated on the dial, which can be represented by a type on the unit wheel G, then one magnet on that wheel will be energized, and if any fractions are indicated by the pointer in addition to said unit number, then one of the electro-magnets on the fraction wheel G will also be energized, this being accomplished by the arrangement of the connections on the switch board, (i. e., the back of the dial), as will now be described.

The back of the dial or switch board is provided with a series of posts O, numbering from 1 to 9 inclusive, these posts being each connected with one of the magnets associated with the unit wheel G. Three additional posts P are electrically connected with the three magnets associated with the fraction wheel G'. Other posts Q, equal in number to the number of magnets associated with the tens wheel G'', are also mounted on the switch board, and electrically connected with such magnets respectively, a few of such connections being indicated in Fig. 3.

It will also be observed in Fig. 3 that the terminals O' on the dial which represent units are each connected with one of the posts O, and each succeeding fraction terminal P' between that unit and the next is electrically connected with one of the posts P, and with said posts O. Therefore, when the dial pointer registers with the terminal representing two and one-half square feet, or units of measurement, the magnet utilized for positioning the type number 2 on unit wheel G will be energized, and the magnet utilized for positioning the one-half type on the fraction wheel will also be energized. Similarly, the dial contacts representing 10 or more are connected with posts Q alone if the dimension is in tens, and intermediate dimension contacts, if representing integral units, are connected with a tens post, and the appropriate units posts. The intermediate fractional contacts are connected with a tens post, a unit post and a fraction post, thereby controlling the rotative movement of all three of the type carrying wheels. Suitable means for guiding the cage F, and its superposed weight housing, are desirable in order to cause the same to move in a vertical direction. In the drawings I have illustrated a frame S having parallel links S' and S'', connected with suitable brackets T on the cage and weight housing. The frame S extends over the weight housing, and the springs J are connected therewith.

I claim:—

1. Leather marking apparatus, including the combination with adjustable mark applying mechanism, of an indicator dial provided with a pointer and an annular row of circular contacts, a selective switch, movable along the contacts, a manually operable lever, operably connected to move the pointer into engagement with a selected contact, and electro-magnetic mechanism adapted to utilize the selected contacts to control the adjustment of the mark applying mechanism.

2. Leather marking apparatus, including the combination with adjustable mark applying mechanism, electro-magnets, each adapted to check the adjusting movements of said mechanism at a predetermined point, a selective circuit closing switch for said magnets, adapted to be actuated into position to close a circuit through any one of said magnets, means for operatively connecting a leather measuring machine, with said switch adapted to actuate the latter to magnet selecting position, and means controlled by a single manually operable member for successively moving the switch from any selecting position to a position for closing an electrical circuit through the selected magnet, and actuating the mark applying mechanism.

3. Leather marking apparatus, including the combination, with adjustable mark applying mechanism, electro-magnets, each adapted to check the adjusting movements of said mechanism at a predetermined point, a magnet selecting circuit closer, provided with an actuating member adapted to transmit motion thereto from a measuring machine, and means for successively adjusting the switch, closing the magnet circuits controlled by it in the adjusting position, adjusting the mark applying mechanism, and actuating the same for a mark applying operation.

4. Leather marking apparatus, including the combination with adjustable mark applying mechanism, electro-magnets, each adapted to check the adjusting movements of said mechanism at a predetermined point, a magnet selecting circuit closer, provided with an actuating member adapted to transmit motion thereto from a measuring machine, and means for successively adjusting the switch, closing the magnet circuits controlled by it in the adjusting position, adjusting the mark applying mechanism, and actuating the same for a mark applying operation, said switch adjusting movement being automatic, and its circuit closing movement being also automatic, subject to manual release during the initial portion of the marking operation.

5. Leather marking apparatus, including the combination, with adjustable mark applying mechanism, electro-magnets, each adapted to check the adjusting movements of said mechanism at a predetermined point, a magnet selecting circuit closer, provided with an actuating member adapted to transmit motion thereto from a measuring machine, means for successively adjusting the switch, closing the magnet circuits controlled by it in the adjusting position, adjusting the mark applying mechanism, and actuating the same for a mark applying operation, said mark applying mechanism including a manually operable lever, and the circuit closing means and the means for adjusting the marking mechanism being automatic, subject to release by said lever during its initial movement.

In testimony whereof I affix my signature in the presence of two witnesses.

ROY E. TOUCHETT.

Witnesses:
H. P. GORDON,
HARRY KLEE.